United States Patent Office 2,948,937
Patented Aug. 16, 1960

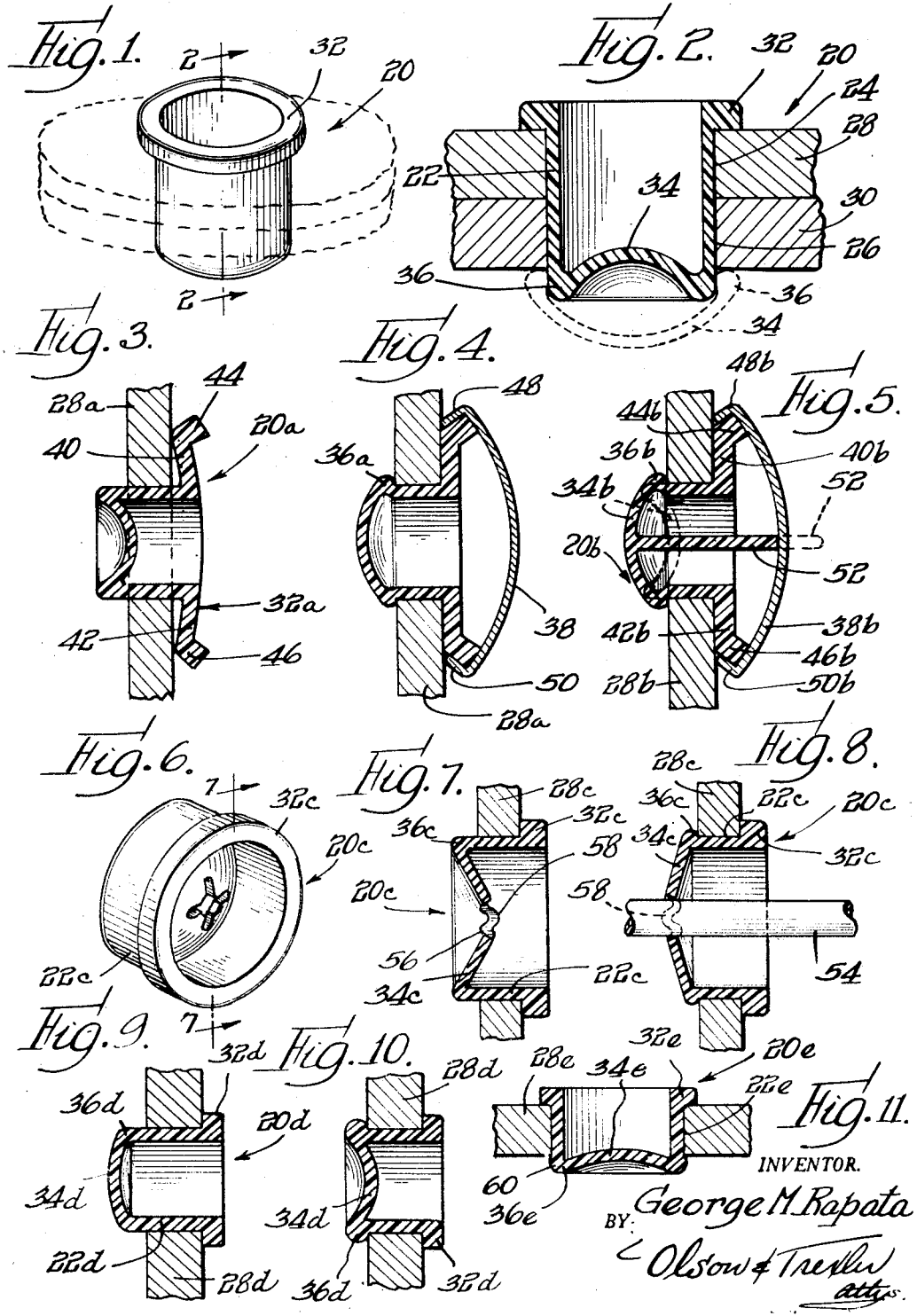

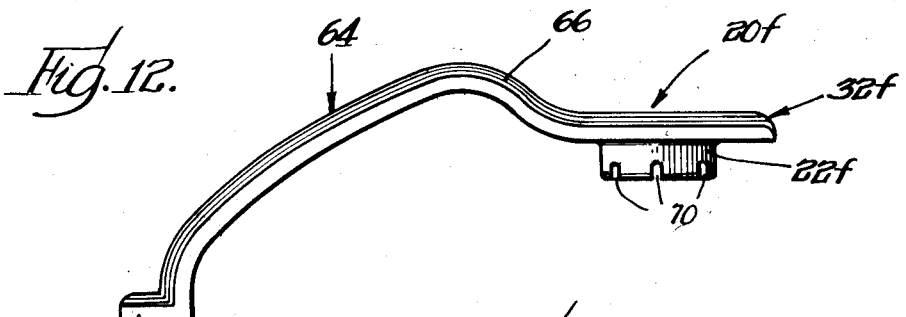
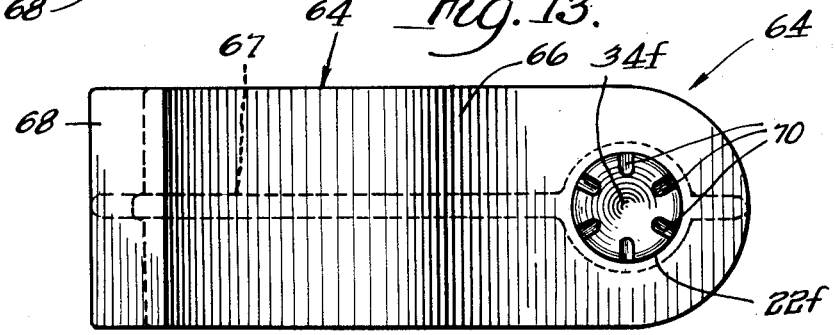
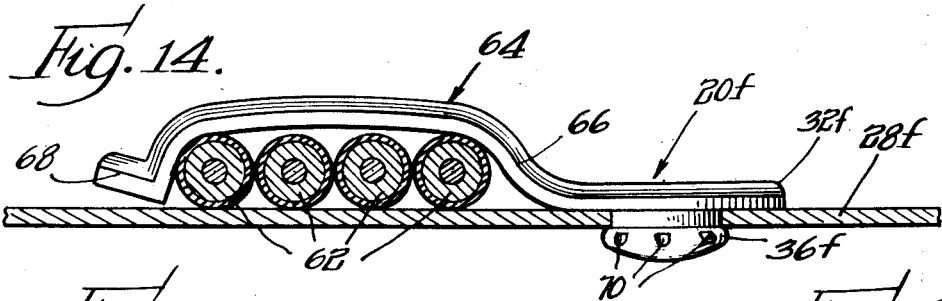
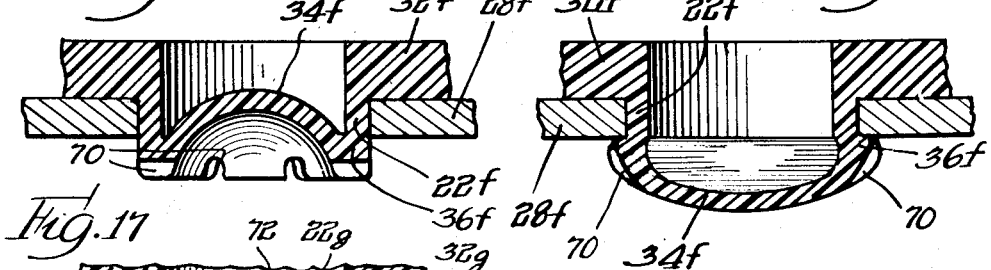
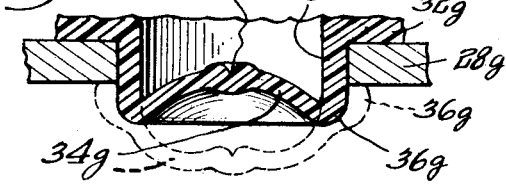

2,948,937

PLASTIC FASTENING DEVICE

George M. Rapata, Park Ridge, Ill., assignor to Illinois Tool Works, Chicago, Ill., a corporation of Illinois Filed Oct. 7, 1955, Ser. No. 539,114

14 Claims. (Cl. 24—73)

The present invention relates to a novel fastening device or a clip, and, more particularly, to a novel device adapted to be applied to an apertured work structure.

Devices embodying the principles of the present invention may be in the form of molding clips, cable clamps, rivet-like fasteners, or stops or bumpers for doors such as glove compartment doors in automobiles, which devices have stud portions for insertion through an aperture in a work structure or a panel. It is an object of the present invention to provide a novel device which may be easily applied to an apertured work structure from one side of the work structure and which is formed so as to clampingly engage the work structure securely to seal the work structure aperture against the passage of dust and moisture and the like and to prevent the device from shifting within the workpiece aperture.

More specifically, it is an object of the present invention to provide a novel one-piece resilient plastic device of the above described type having a stud portion which may be easily and securely applied to a panel or other apertured work structure without the use of auxiliary fastening means such as nut members and the like and which stud portion may be readily removed from the work structure if desired without injury thereto so that the device may be re-used repeatedly.

Another object of the present invention is to provide a novel plastic device of the above described type which is formed so that the stud portion may be easily inserted through a workpiece aperture without hammering or the application of a force or pressure and so that the stud portion may be expanded securely to connect it with the work structure and subsequently contracted to release it from the work structure, if desired.

Other objects and advantages of the present invention will become apparent from the following description and the accompanying drawings wherein:

Fig. 1 is a perspective view showing a device embodying the principles of this invention, which device may be used as a rivet-like fastener or as a sound-deadening bumper or stop for doors or the like;

Fig. 2 is an enlarged cross sectional view of the fastener taken along line 2—2 in Fig. 1 and further showing the fastener applied to a work structure including a pair of apertured panels;

Fig. 3 is a sectional view showing a molding clip embodying the principles of this invention applied to an apertured panel and in position to have the stud portion expanded for securing the fastener to the panel;

Fig. 4 is a sectional view showing the device of Fig. 3 fully assembled with the panel and supporting a molding strip;

Fig. 5 is a sectional view similar to Fig. 4 but showing a modified form of the present invention;

Fig. 6 is a perspective view showing another modified form of the present invention;

Fig. 7 is a sectional view taken along line 7—7 in Fig. 6 and further showing the device applied to an apertured panel;

Fig. 8 is a sectional view similar to Fig. 7 but showing the device in an expanded condition;

Fig. 9 is a sectional view showing another modified form of the present invention;

Fig. 10 is a sectional view similar to Fig. 9 but showing the device in an expanded condition and securely connected with the apertured panel;

Fig. 11 is a cross sectional view showing still another modified form of the present invention;

Figs. 12 and 13 are respectively an elevational view and a bottom view of another form of this invention;

Fig. 14 is a partial sectional view showing the cable clamp of Figs. 12 and 13 applied to a workpiece;

Figs. 15 and 16 are respectively enlarged fragmentary sectional views showing the stud portion of the cable clamp initially and fully applied to a workpiece; and Fig. 17 is a fragmentary sectional view showing another modification of this invention.

Referring now more specifically to the drawings wherein like parts are designated by the same numerals throughout the various figures, a fastening device 20 embodying the principles of this invention is shown in Figs. 1 and 2. The device 20, as well as the embodiments, described below is molded from a suitable resilient plastic material such as nylon or polyethylene. In this embodiment, the fastening device comprises a hollow tubular stud or shank portion 22 having an axial length greater than the thickness of the work structure to which the device is to be applied. For example, in Fig. 2 the device 20 is shown inserted through apertures 24 and 26 in a work structure comprising panels 28 and 30. The tubular shank preferably has an outside diameter which is similar to but slightly less than the diameter of the apertures 24 and 26 so that the shank may be easily slipped through the apertures. The diameter of the shank is preferably substantially uniform throughout its length and the shank is provided with a uniform wall thickness substantially throughout its length so as to facilitate molding thereof.

In order to secure the device 20 to the work structure, an annular flange or head portion 32 is provided at the outer end of the shank 22 for engaging the outer surface of the work structure and the inner or entering end of the shank is adapted to be expanded for engaging the inner surface of the work structure in the manner described below. More specifically, the device 20 is provided with an end wall 34 which is joined to the annular margin of the entering end of the shank as at 36 and which is initially molded so that it extends radially and axially inwardly and has a concave shape as shown in solid lines in Fig. 2. It should be noted that the annular junction 36 between the shank 22 and the end wall 34 has substantially greater axial and radial cross sectional thickness than either the cross sectional thickness of the shank 22 or the wall 34 so that the annular junction is relatively rigid.

When applying the device 20 to an apertured work structure, the device is first inserted through the workpiece apertures as shown in solid lines in Fig. 2. Then a suitable tool, not shown, is inserted through the aperture in the head portion 32 and into the hollow shank portion and is pressed downwardly against the end wall 34. The end wall 34 is then flexed or deformed from the position shown in solid lines at one side of a plane disposed normal to the longitudinal shank axis and extending through the junction 36 toward the opposite side of this plane to the position shown in broken lines. As the end wall 34 is flexed in this manner, the shank 22 is expanded adjacent the entering end thereof and the annular junction 36 is expanded beneath the work structure so as to cooperate with the head portion 32 to clampingly engage the work structure. The annular junction 36 in the expanded condition provides a relatively rigid shoulder capable of withstanding substantially axially directed stresses so as to prevent unauthorized separation of the device from the work structure. It should be noted that the end wall 34 in the broken line position has been made to pass the center or plane extending through the center of the annular junction 36, and that the inherent resiliency of the plastic material provides a tendency for the end wall to return to its original position. Such return movement is, however, prevented since it would require additional expansion of the annular junction or shoulder portion 36 from the position shown in broken lines and the inherent resiliency of the plastic material is not sufficient to provide the force necessary to obtain such additional expansion. The force provided by the inherent resiliency of the material is sufficient, however, to press the annular junction 36 or shoulder portion firmly against the inner surface of the work structure so as to provide an annular seal encircling the work structure apertures and so that the device 20 is precluded from shifting within the workpiece apertures in the event there is a loose fit between the shank portion and the aperture walls.

In Figs. 3 and 4 there is shown an embodiment of the present invention which is similar to the above described structure as indicated by the application of identical reference numerals with the suffix "a" added to corresponding elements. This embodiment differs in that the head portion 32a is formed so as to mount a molding strip 38. More specifically, the apertured head portion 32a includes a pair of arms 40 and 42 extending generally radially from the shank portion and terminating in upwardly and outwardly flaring flanges 44 and 46 adapted to cooperate with inturned flanges 48 and 50 on the molding strip in the manner shown in Fig. 4. In this embodiment, the arms 40 and 42 of the head portion are initially formed so that they are inclined toward the entering end of the shank portion as shown in Fig. 3. Thus, when the clip 20a is applied to the apertured panel as shown in Fig. 4, the inherent resiliency of the arms combines with the resilient clamping action of the shoulder portion 36a to provide improved clamping engagement of the clip member with the apertured panel.

Fig. 5 shows another modified form of the present invention which is similar to the embodiment of Figs. 3 and 4 as indicated by the application of identical reference numerals with the suffix "b" added to corresponding elements. This embodiment differs in that an axially extending locking pin 52 is formed integrally with the end wall 34b. The locking pin extends so that when the clip member 20b is applied to an apertured panel, the free end of the pin is disposed for engagement with the inner surface of the molding strip 38b so as positively to prevent the end wall 34b from snapping back to its original position shown in broken lines. Thus, the molding clip 20b is positively locked against accidental unauthorized disassembly from the apertured work structure.

Figs. 6, 7 and 8 show a further modification of the present invention which is similar to the above described structures as indicated by the application of identical reference numerals with the suffix "c" added to corresponding elements. This embodiment is in the form of a grommet which is adapted to receive and support an elongated element such as an electrical wire or cable 54. More specifically, the end wall 34c is provided with a central aperture 56 through which the wire or cable 54 may be passed. Preferably, the aperture 56 is formed so that its normal diameter is slightly less than the diameter of the cable, and the bottom or end wall 34c is provided with a plurality of radially extending corrugations 58. The corrugations permit the aperture 56 to be expanded for receiving the cable, and the inherent resiliency of the plastic material causes the margin of the aperture 56 to grip the cable tightly for restraining axial movement of the cable and also for sealing the aperture against the passage of moisture, dust and the like therethrough.

In Figs. 9 and 10 there is shown a further modified form of the present invention which is similar to the above described structures as indicated by the application of identical reference numerals with the suffix "d" added to corresponding elements. In this embodiment, the end wall 34d is initially formed as shown in Fig. 9 so that it is curved axially outwardly from the entering end of the shank portion 22d. The device 20d is securely connected with the apertured work structure by flexing the end wall 34d inwardly across the plane of the annular junction 36d to the position shown in Fig. 10. This may be accomplished either by applying pressure with a tool to the outer surface of the end wall 34d or by applying a vacuum to the open end of the hollow shank.

Fig. 11 shows still another modified form of the present invention which is similar to the above described structures as indicated by the appliction of identical reference numerals with the suffix "e" added to corresponding elements. This embodiment differs in that the annular junction 36d is formed so that it initially projects slightly radially outwardly of the shank wall 22e as indicated at 60, which annular projection 60 may be snapped through the apertured work structure and serves to retain the device 20e in assembled relationship with the work structure before the end wall 34e is flexed to the broken line position. The annular projection 60 is formed so that it extends only slightly radially outwardly of the shank 22e so that it may be readily compressed sufficiently to permit insertion of the shank into the apertured work structure. It will be appreciated that while the locking action of the projection 60 is relatively weak, it will be sufficient to maintain the device 20e in assembled relationship with the work structure until the end wall 34e can be deformed to expand the junction or shoulder portion 36e beneath the panel.

In Figs. 12 through 16 there is shown a further embodiment of the present invention which is similar to the above described structures as indicated by the application of identical reference numerals with the suffix "f" added to corresponding elements. In this embodiment the device 20f is in the form of a clip or clamp which is adapted to retain one or more cables or conduits 62 against the surface of an apertured panel or workpiece 28f. More particularly, the head portion 32f of the clamp is provided with an elongated integral arm or extension 64 which extends generally laterally from the shank or stud portion 22f. Preferably, the arm 64 is formed upwardly or generally axially away from the stud portion as at 66 and then extends downwardly so that the outer end thereof completely traverses and extends axially inwardly of the stud or shank portion 22f. Thus, when the clamp is applied to an apertured work structure as shown in Fig. 14, the arm 64 must be flexed outwardly, and the inherent resiliency of the arm tends to return it to its initial position with respect to the stud portion so that the cables or conduits will be resiliently clamped and held against the workpiece. Preferably, a rib or bead 67 extends longitudinally of the arm 64 for increasing the strength and rigidity of the arm, and an outwardly extending flange 68 is provided at the outer end of the arm to facilitate lifting of the arm when the clamp is applied to a workpiece as shown in Fig. 14 so that the cables or conduits may be inserted beneath the arm or removed therefrom.

The stud or shank portion of the clamp 20f is substantially identical to the corresponding portions of the devices described above and the clamp 20f is applied to the apertured work structure by first inserting the stud portion through the workpiece aperture and then flexing the bottom or transverse wall section 34f so as to expand the portion 36f. However, it should be noted that in this embodiment the junction portion 36f is provided with a plurality of circumferentially spaced notches 70 which serve to reduce the amount of material in the junction portion so that expansion of the junction portion is facilitated. At the same time, the lateral extent to which the junction portion 36f is expanded beneath the workpiece as shown in Fig. 16 is not diminished by the notches so that the holding power of the fastening section or stud portion of the clamp 20f compares favorably with the devices described above. It will be appreciated that, if desired, the junction portions of the devices described above may also be provided with notches or recesses similar to the notches 70. Also, instead of providing notches as shown, the junction portion could be made thinner and reinforced by a plurality of radially extending ribs (not shown) which would correspond to the illustrated section of the junction portion between the notches.

In Fig. 17 there is shown another modified form of this invention which is similar to the above described device as indicated by the application of identical reference numerals with the suffix "g" added to corresponding elements. This embodiment differs in that the end wall 34g is provided with a centrally located rigidifying dimple 72. This dimple stiffens the end wall so as to promote rolling of the junction portion to the expanded condition shown in broken lines when the end wall is pressed downwardly with a tool, not shown. The dimple may also serve to receive and center the tool with respect to the end wall. It will be appreciated other embodiments of the device described above may also be provided with a rigidifying offset portion or dimple in their respective end walls.

From the above description it is seen that the present invention has provided a novel plastic device which is of simple and economical construction and which may be easily and securely assembled with an apertured work structure. Furthermore, it is to be noted that the device of the present invention may be easily removed from the work structure without injury to either the device or the work structure merely by flexing the end wall back to its original position so that the entering end or shoulder at the entering end of the shank portion is allowed to contract to its original position. It is also seen that the device of the present invention is formed so as to clamp tightly a work structure therebetween and to seal the work structure aperture, if desired.

While the preferred embodiments of the present invention have been shown and described herein, it is obvious that many structural details may be changed without departing from the spirit and scope of the appended claims.

The invention is claimed as follows:

1. A molded one-piece resilient plastic device of the type described for application to a work structure of predetermined thickness and having an aperture therethrough of predetermined diameter, comprising an apertured head portion engageable with one side of the work structure, a hollow shank portion extending axially from said head portion for insertion through said aperture and having a length greater than said predetermined thickness and a diameter less than said predetermined diameter and a substantially uniform wall thickness throughout, a resilient end wall disposed adjacent to the entering end of and substantially traversing said hollow shank portion, and a substantially annular junction portion integrally joining the entering end of said shank portion and said end wall and initially having an outside diameter substantially equal to said shank portion diameter, said end wall initially extending radially inwardly and axially of said junction portion and being disposed substantially at one side of a plane normal to the shank portion axis and intersecting said junction portion, said end wall being sufficiently thin to render it flexible to permit its flexing across said plane to a position at the opposite side thereof and thereafter to be flexed to its original position, if desired, the entering end of said shank portion and said junction portion being radially expanded upon initial flexing of the end wall across said plane for engaging a side of the work structure opposite from said head portion, and said end wall, when initially flexed to said opposite side of the plane, providing a resilient strut for yieldably pressing said expanded junction portion against said opposite side of the work structure.

2. A one-piece plastic device, as defined in claim 1, wherein said end wall has a generally centrally located aperture therethrough for receiving an elongated element such as a cable, said last mentioned aperture being contracted upon flexing of said end wall across said plane to the opposite side of said plane so that the end wall grips and retains said cable.

3. A plastic device, as defined in claim 2, wherein said end wall includes a plurality of generally radially extending undulated portions circumferentially spaced around said last mentioned aperture so as to facilitate collapsing of said last mentioned aperture and resilient gripping of the cable by said end wall.

4. A plastic device, as defined in claim 1, wherein said head portion is provided with a central aperture and includes oppositely extending arm sections terminating in outwardly flaring flanges for retaining a molding strip or the like, and which includes a locking pin-like member integrally connected with said end wall and extending axially through said shank and said head portion aperture for engaging an inner surface of a molding strip or the like retained by said flanges when said end wall is flexed to said opposite side of the plane for positively preventing the end wall from returning to its initial position at said one side of the plane.

5. A molded one-piece resilient plastic device of the type described for application to a work structure of predetermined thickness and having an aperture therethrough of predetermined diameter, comprising an apertured head portion engageable with one side of the work structure, a hollow shank portion extending axially from said head portion for insertion through said aperture and having a length greater than said predetermined thickness and an outside diameter less than said predetermined diameter and a substantially uniform wall thickness throughout, a resilient end wall disposed adjacent to the entering end of an substantially traversing said hollow shank portion, and a substantially annular junction portion integrally joining the entering end of said shank portion and said end wall and initially having an outside diameter substantially equal to said shank portion diameter, said junction portion having radial and axial cross sectional thicknesses greater than the radial cross sectional thickness of said shank portion so that said junction portion is relatively rigid as compared with said shank portion, said end wall initially extending radially inwardly and axially of said junction portion and being disposed substantially at one side of a plane normal to the shank portion axis and intersecting said junction portion, said end wall being sufficiently thin to render it flexible to permit its flexing across said plane to a position at the opposite side thereof and thereafter to be flexed to its original position if desired, the entering end of said shank portion and said junction portion being radially expanded upon initial flexing of the end wall across said plane for engaging a side of the work structure opposite from said head portion, and said end wall after its initial flexing to said opposite side of said plane providing a resilient strut for yieldably pressing said expanded junction portion against said opposite side of the work structure.

6. A device, as defined in claim 5, wherein said junction portion initially has an outside diameter slightly greater than said predetermined diameter so that said junction portion projects slightly radially outwardly of said shank portion for initially retaining the device in assembled relationship with a work structure prior to flexing of the end wall and expanding of the junction portion.

7. A device, as defined in claim 5, wherein said end wall initially extends from said junction portion axially inwardly of said shank portion.

8. A device, as defined in claim 5, wherein said end wall initially extends from said junction portion axially outwardly of said shank portion.

9. A device, as defined in claim 5, wherein said head portion includes a pair of oppositely disposed arm sections extending generally radially outwardly from said shank portion and axially toward the entering end of the shank portion, said arms being adapted to be flexed upon application of the device to a work structure to provide an additional resilient force biasing the expanded junction portion against said opposite side of the work structure.

10. A device, as defined in claim 9, which includes means extending from said head portion arm sections for retaining a molding strip or the like.

11. A one piece molded resilient plastic device for application to an apertured work structure comprising an apertured head portion engageable with one side of a work structure, a hollow shank portion extending generally axially from said head portion for insertion through an aperture in a work structure and having a predetermined outside diameter, a resilient end wall substantially traversing said hollow shank portion, a junction portion integrally joining the entering end of said shank portion and said end wall and having an outside diameter normally substantially similar to said predetermined diameter, said end wall being generally concavo-convex in shape and initially being disposed substantially at one side of a plane generally normal to the longitudinal axis of said shank portion and intersecting said junction portion, said end wall being sufficiently thin to render said end wall flexible for ready movement across said plane to a position at the opposite side thereof and thereafter being capable of flexure to its original position if desired, flexing of said end wall by an operator to the opposite side of said plane after said shank portion has been inserted through said aperture causing said junction portion to expand radially for projecting beneath said work structure, said junction portion having recess means therein reducing the thickness of limited areas thereof to facilitate expansion thereof without decreasing the possible radial extent of such expansion, and said end wall when at said opposite side of the plane providing a resilient strut for biasing the expanded junction portion into engagement with the work structure.

12. A device, as defined in claim 11, wherein said recess means includes a plurality of circumferentially spaced notches in an axially outwardly facing end of said junction portion.

13. A device, as defined in claim 11, wherein said head portion includes an integral resilient arm extending laterally and traversing said shank portion so that the arm must be flexed outwardly upon application of the device to a work structure whereby an article to be retained placed beneath the arm will be resiliently clamped against the work structure.

14. A one-piece plastic device, as defined in claim 1, wherein said end wall includes a centrally located axially offset rigidifying portion so as to promote expanding of the junction portion when said end wall is flexed to said opposite side of said plane.

References Cited in the file of this patent

UNITED STATES PATENTS

| | | |
|---|---|---|
| 1,810,576 | Reiter | June 16, 1931 |
| 1,981,973 | Tinnerman | Nov. 27, 1934 |
| 2,398,532 | Keehn | Apr. 16, 1946 |
| 2,562,721 | Jakosky | July 31, 1951 |
| 2,709,290 | Rosenthal | May 31, 1955 |
| 2,759,390 | Edwards | Aug. 21, 1956 |
| 2,849,201 | Schelgunov | Aug. 26, 1958 |

FOREIGN PATENTS

| | | |
|---|---|---|
| 557,328 | Great Britain | Nov. 16, 1943 |
| 1,019,862 | France | Nov. 5, 1952 |
| 1,051,695 | France | Sept. 16, 1953 |